United States Patent
Wise et al.

(10) Patent No.: US 12,533,130 B2
(45) Date of Patent: Jan. 27, 2026

(54) SURGICAL STAPLER KNIFE MOTION CONTROLS

(71) Applicant: Cilag GmbH International, Zug (CH)

(72) Inventors: Austin E. Wise, Cincinnati, OH (US); Morgan R. Hunter, Cincinnati, OH (US)

(73) Assignee: Cilag GmbH International, Zug (CH)

( * ) Notice: Subject to any disclaimer, the term of this patent is extended or adjusted under 35 U.S.C. 154(b) by 0 days.

(21) Appl. No.: 18/821,936

(22) Filed: Aug. 30, 2024

(65) Prior Publication Data
US 2025/0057530 A1    Feb. 20, 2025

Related U.S. Application Data

(63) Continuation of application No. 17/458,967, filed on Aug. 27, 2021, now Pat. No. 12,076,011, which is a continuation of application No. 15/797,200, filed on Oct. 30, 2017, now Pat. No. 11,134,944.

(51) Int. Cl.
| | | |
|---|---|---|
| *A61B 17/072* | (2006.01) | |
| *A61B 17/00* | (2006.01) | |
| *A61B 17/29* | (2006.01) | |
| *A61B 34/30* | (2016.01) | |
| *A61B 90/00* | (2016.01) | |

(52) U.S. Cl.
CPC ............ *A61B 17/07207* (2013.01); *A61B 2017/00017* (2013.01); *A61B 2017/00398* (2013.01); *A61B 2017/0046* (2013.01); *A61B 2017/07257* (2013.01); *A61B 2017/07271* (2013.01); *A61B 2017/07278* (2013.01); *A61B 2017/07285* (2013.01); *A61B 2017/2927* (2013.01); *A61B 34/30* (2016.02); *A61B 2090/034* (2016.02); *A61B 2090/065* (2016.02); *A61B 2090/0814* (2016.02)

(58) Field of Classification Search
CPC .... A61B 17/07207; A61B 2017/00017; A61B 2017/00398; A61B 2017/0046; A61B 2017/07257; A61B 2017/07271; A61B 2017/07278; A61B 2017/07285; A61B 2017/2927; A61B 2090/034; A61B 2090/065; A61B 2090/0814; A61B 34/30
See application file for complete search history.

(56) References Cited

U.S. PATENT DOCUMENTS

| | | |
|---|---|---|
| 5,465,895 A | 11/1995 | Knodel et al. |
| 5,673,841 A | 10/1997 | Schulze et al. |
| 6,988,649 B2 | 1/2006 | Shelton, IV et al. |

(Continued)

FOREIGN PATENT DOCUMENTS

EP    3135225 A2    3/2017

*Primary Examiner* — Himchan Song
(74) *Attorney, Agent, or Firm* — Lempia Summerfield Katz LLC

(57) ABSTRACT

A surgical instrument includes an end effector, a firing member movable distally to effect a firing motion at the end effector, wherein the firing member comprises a cam slot, and a lockout pawl. The lockout pawl has a cam feature receivable in the cam slot, wherein the cam slot is configured to guide the cam feature to cause a rotation of the lockout pawl between a first position where the lockout pawl permits the distal movement of the firing member, and a second position where the lockout pawl prevents the distal movement of the firing member.

13 Claims, 10 Drawing Sheets

(56) References Cited

U.S. PATENT DOCUMENTS

| | | | |
|---|---|---|---|
| 9,072,535 B2 | 7/2015 | Shelton, IV et al. | |
| 9,320,520 B2 * | 4/2016 | Shelton, IV | A61B 17/07207 |
| 9,393,015 B2 * | 7/2016 | Laurent | A61B 90/30 |
| 9,668,729 B2 | 6/2017 | Williams et al. | |
| 9,757,126 B2 | 9/2017 | Cappola | |
| 10,335,147 B2 | 7/2019 | Rector et al. | |
| 10,537,325 B2 | 1/2020 | Bakos et al. | |
| 11,090,048 B2 | 8/2021 | Fanelli et al. | |
| 11,134,944 B2 | 10/2021 | Wise et al. | |
| 12,076,011 B2 | 9/2024 | Wise et al. | |
| 12,178,434 B2 * | 12/2024 | Shelton, IV | A61B 34/30 |
| 2008/0167670 A1 * | 7/2008 | Shelton | A61B 17/07207 |
| | | | 606/167 |
| 2014/0224686 A1 * | 8/2014 | Aronhalt | A61B 17/072 |
| | | | 206/339 |
| 2014/0249557 A1 * | 9/2014 | Koch, Jr. | A61B 90/98 |
| | | | 606/170 |
| 2014/0263545 A1 * | 9/2014 | Williams | A61B 17/068 |
| | | | 227/175.2 |
| 2015/0053737 A1 * | 2/2015 | Leimbach | G16H 40/63 |
| | | | 227/175.1 |
| 2015/0374373 A1 * | 12/2015 | Rector | A61B 17/105 |
| | | | 606/219 |
| 2016/0270780 A1 * | 9/2016 | Hall | A61B 90/90 |
| 2017/0007255 A1 * | 1/2017 | Jaworek | A61B 17/07207 |
| 2018/0168622 A1 * | 6/2018 | Shelton, IV | A61B 17/07207 |
| 2021/0282776 A1 * | 9/2021 | Overmyer | A61B 17/07207 |
| 2024/0081818 A1 * | 3/2024 | Shelton, IV | A61B 17/295 |
| 2025/0107801 A1 * | 4/2025 | Knapp | A61B 17/068 |

\* cited by examiner

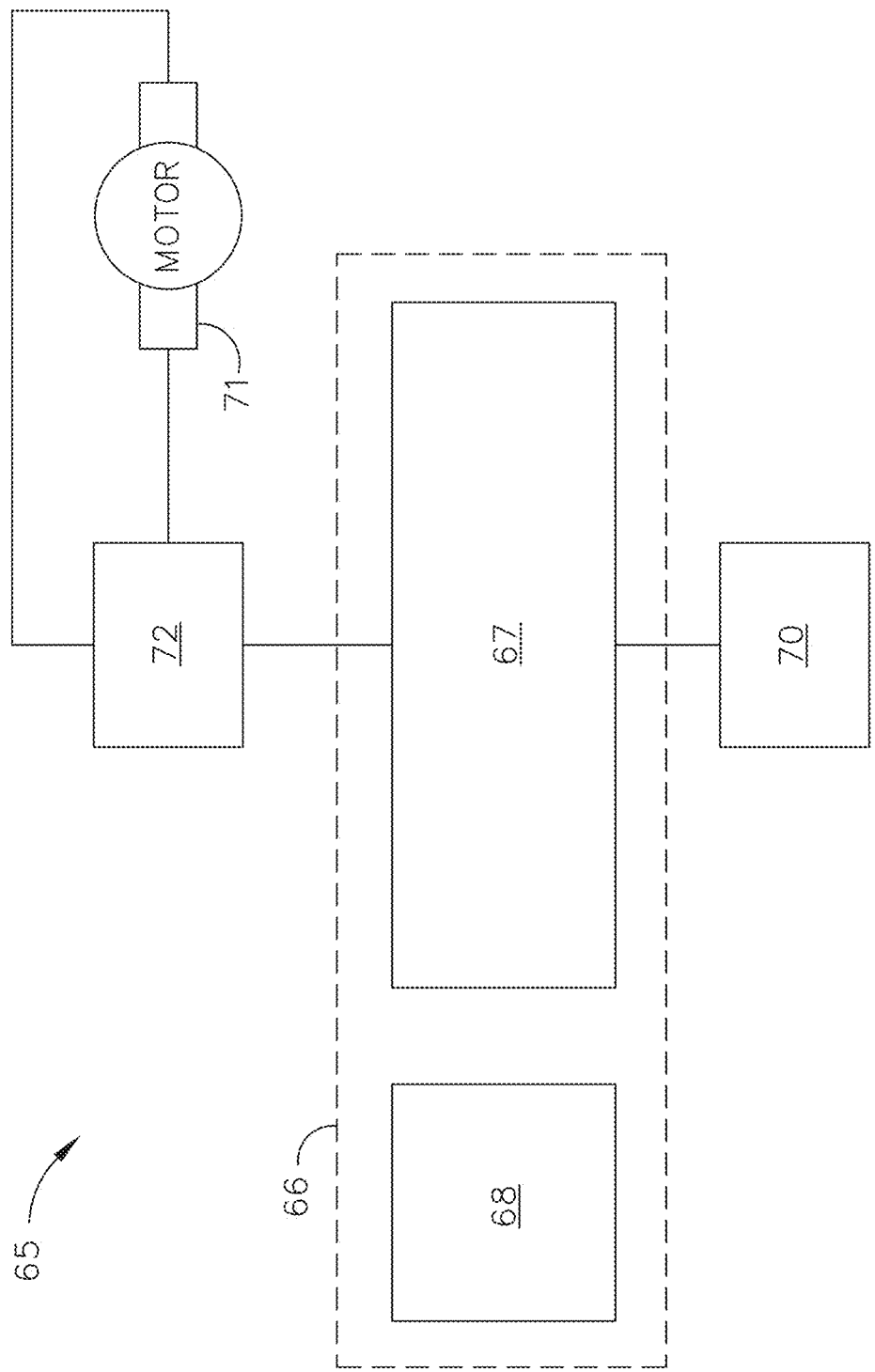

SURGICAL STAPLER KNIFE MOTION CONTROLS

CROSS-REFERENCE TO RELATED APPLICATION

The present application is a continuation application claiming priority under 35 U.S.C. § 120 to U.S. patent application Ser. No. 17/458,967, entitled SURGICAL STAPLER KNIFE MOTION CONTROLS, filed Aug. 27, 2021, now U.S. Patent Application Publication No. 2022/0117602, which claims priority to 35 U.S.C. § 120 to U.S. patent application Ser. No. 15/797,200, entitled SURGICAL STAPLER KNIFE MOTION CONTROLS, filed Oct. 30, 2017, which issued on Oct. 5, 2021, now U.S. Pat. No. 11,134,944, the entire disclosure of which is hereby incorporated by reference herein.

BACKGROUND

The present invention relates to surgical instruments and, in various arrangements, to surgical stapling and cutting instruments and staple cartridges for use therewith that are designed to staple and cut tissue.

BRIEF DESCRIPTION OF THE DRAWINGS

Various features of the embodiments described herein, together with advantages thereof, may be understood in accordance with the following description taken in conjunction with the accompanying drawings as follows:

FIG. 16 is a logic diagram of a control circuit of the surgical instrument of FIG. 1.

DETAILED DESCRIPTION

Figure 1:
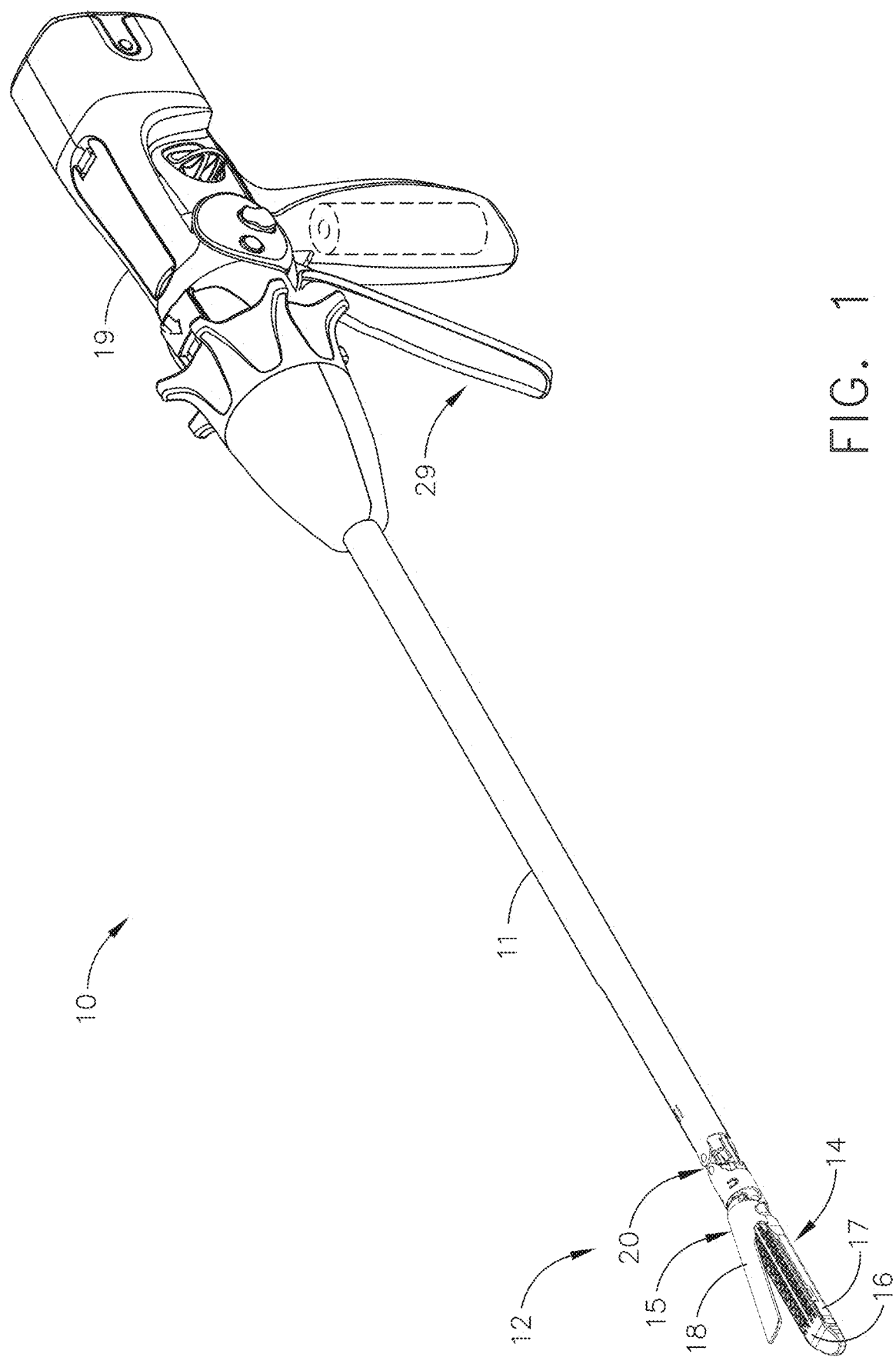
FIG. 1 illustrates perspective view of a surgical instrument in accordance with at least one aspect of the present disclosure.

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a surgical system, device, or apparatus that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The terms "proximal" and "distal" are used herein with reference to a clinician manipulating the handle portion of the surgical instrument. The term "proximal" refers to the portion closest to the clinician and the term "distal" refers to the portion located away from the clinician. It will be further appreciated that, for convenience and clarity, spatial terms such as "vertical", "horizontal", "up", and "down" may be used herein with respect to the drawings. However, surgical instruments are used in many orientations and positions, and these terms are not intended to be limiting and/or absolute.

Various exemplary devices and methods are provided for performing laparoscopic and minimally invasive surgical procedures. However, the reader will readily appreciate that the various methods and devices disclosed herein can be used in numerous surgical procedures and applications including, for example, in connection with open surgical procedures. As the present Detailed Description proceeds, the reader will further appreciate that the various instruments disclosed herein can be inserted into a body in any way, such as through a natural orifice, through an incision or puncture hole formed in tissue, etc. The working portions or end effector portions of the instruments can be inserted directly into a patient's body or can be inserted through an access device that has a working channel through which the end effector and elongate shaft of a surgical instrument can be advanced.

Although various aspects of the present disclosure have been described herein in connection with linear staplers, these aspects can be similarly implemented in other surgical staplers such as, for example, circular staplers and/or curved staplers. Also although various aspects of the present disclosure are described in connection with a hand-held instrument, these aspects can be similarly implemented in robotic surgical systems. Various suitable robotic surgical systems are disclosed in U.S. Patent Application Publication No. 2012/0298719, entitled SURGICAL STAPLING INSTRUMENTS WITH ROTATABLE STAPLE DEPLOYMENT ARRANGEMENTS, filed May 27, 2011, now U.S. Pat. No. 9,072,535, the entire disclosure of which is incorporated by reference herein.

Figure 2:
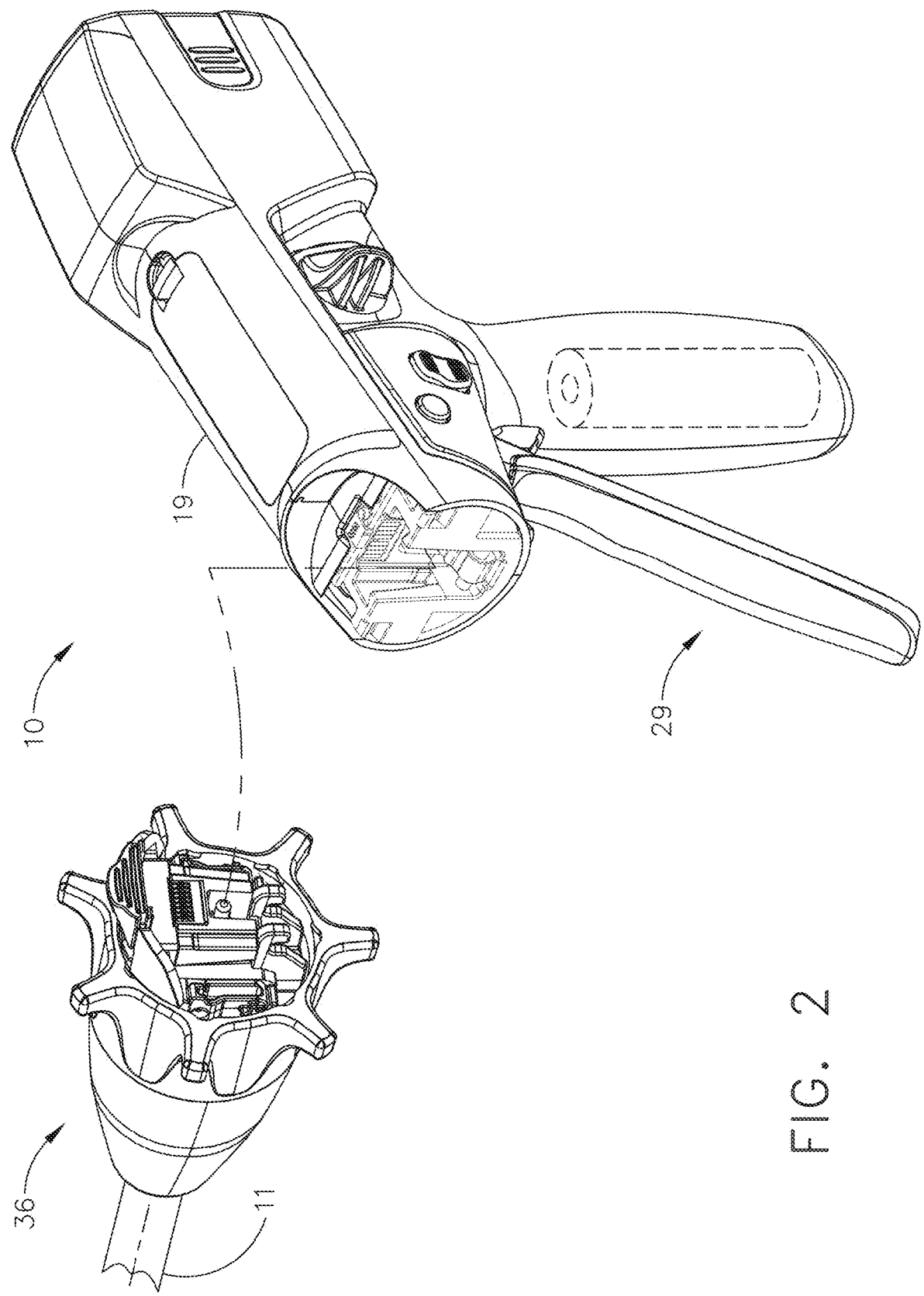
FIG. 2 illustrates is a partial perspective view of an interchangeable shaft assembly and a perspective view of a handle of the surgical instrument of FIG. 1 in an unassembled configuration.
Figure 3:
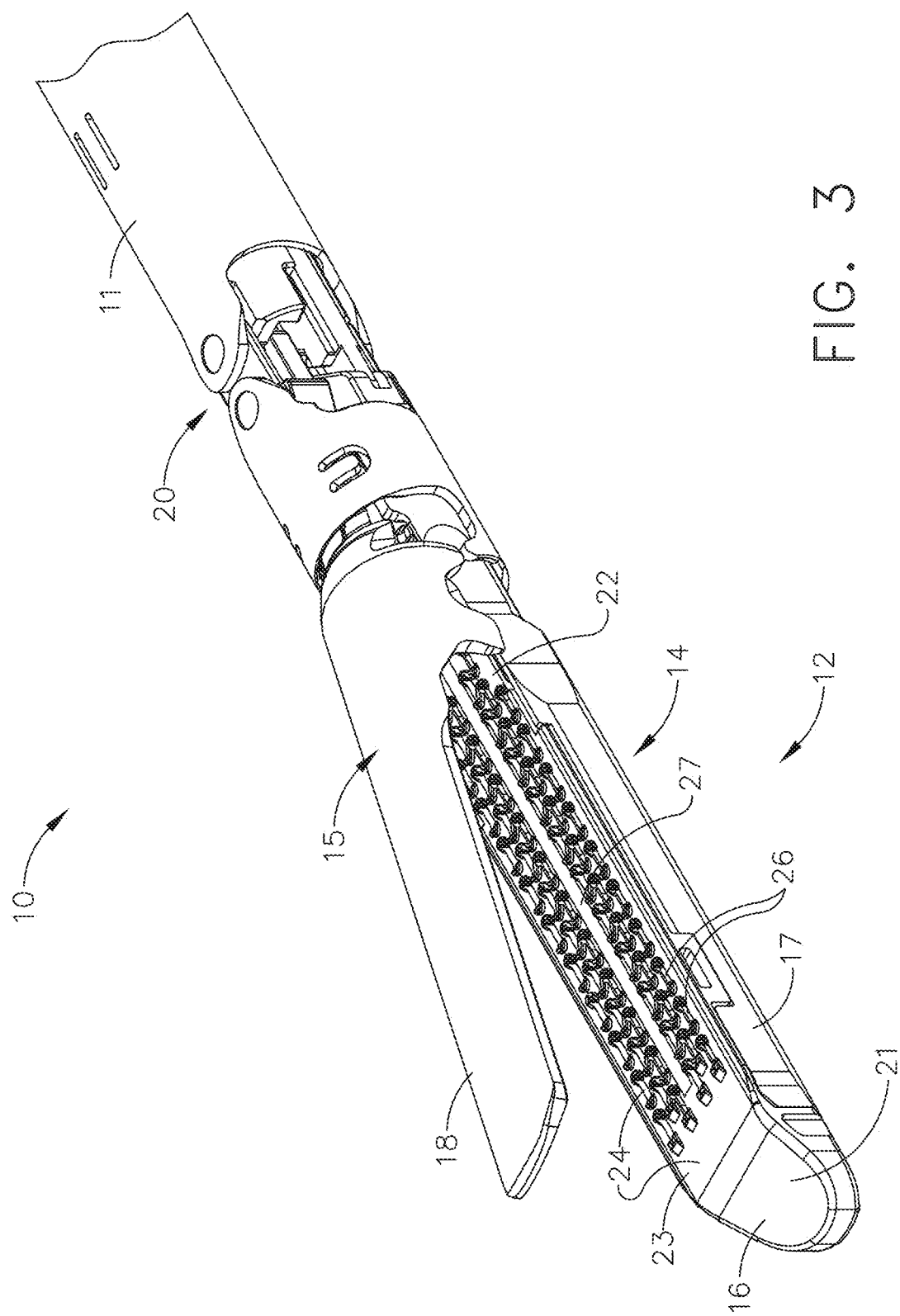
FIG. 3 illustrates a perspective view of an end effector of the surgical instrument of FIG. 1.

Referring primarily to FIGS. 1-3, a surgical instrument 10 comprises a shaft 11 and an end effector 12 extending from the shaft 11. The end effector 12 comprises a first jaw 14 and a second jaw 15. The first jaw 14 comprises a staple cartridge 16. The staple cartridge 16 is insertable into and removable from a cartridge pan or channel 17 of the first jaw 14; however, other embodiments are envisioned in which the staple cartridge 16 is not removable from, or at least readily replaceable from, the first jaw 14. The second jaw 15 comprises an anvil 18 configured to deform staples ejected from the staple cartridge 16. The second jaw 15 is pivotable relative to the first jaw 14 about a closure axis; however, other embodiments are envisioned in which the first jaw 14 is pivotable relative to the second jaw 15. The surgical instrument 10 further comprises an articulation joint 20 configured to permit the end effector 12 to be rotated, or articulated, relative to the shaft 11. The end effector 12 is rotatable about an articulation axis extending through the articulation joint 20. Other embodiments are envisioned which do not include an articulation joint.

Referring to FIG. 2, in various examples, the surgical instrument 10 includes a housing 19 that comprises a handle assembly 29 that is configured to be grasped, manipulated, and actuated by the clinician. The housing 19 is configured for operable attachment to an interchangeable shaft assembly 36, which includes the end effector 12 and at least a portion of the shaft 11. In accordance with the present disclosure, various forms of interchangeable shaft assemblies may be effectively employed in connection with robotically controlled surgical systems as well hand-held instruments. The term "housing" may encompass a housing or similar portion of a robotic system that houses or otherwise operably supports at least one drive system configured to generate and apply at least one control motion that could be used to actuate interchangeable shaft assemblies. The term "frame" may refer to a portion of a hand-held surgical instrument. The term "frame" also may represent a portion of a robotically controlled surgical instrument and/or a portion of the robotic system that may be used to operably control a surgical instrument. Interchangeable shaft assemblies may be employed with various robotic systems, instruments, components, and methods disclosed in U.S. Pat. No. 9,072,535, entitled SURGICAL STAPLING INSTRUMENTS WITH ROTATABLE STAPLE DEPLOYMENT ARRANGEMENTS, which is herein incorporated by reference in its entirety.

Figure 4:
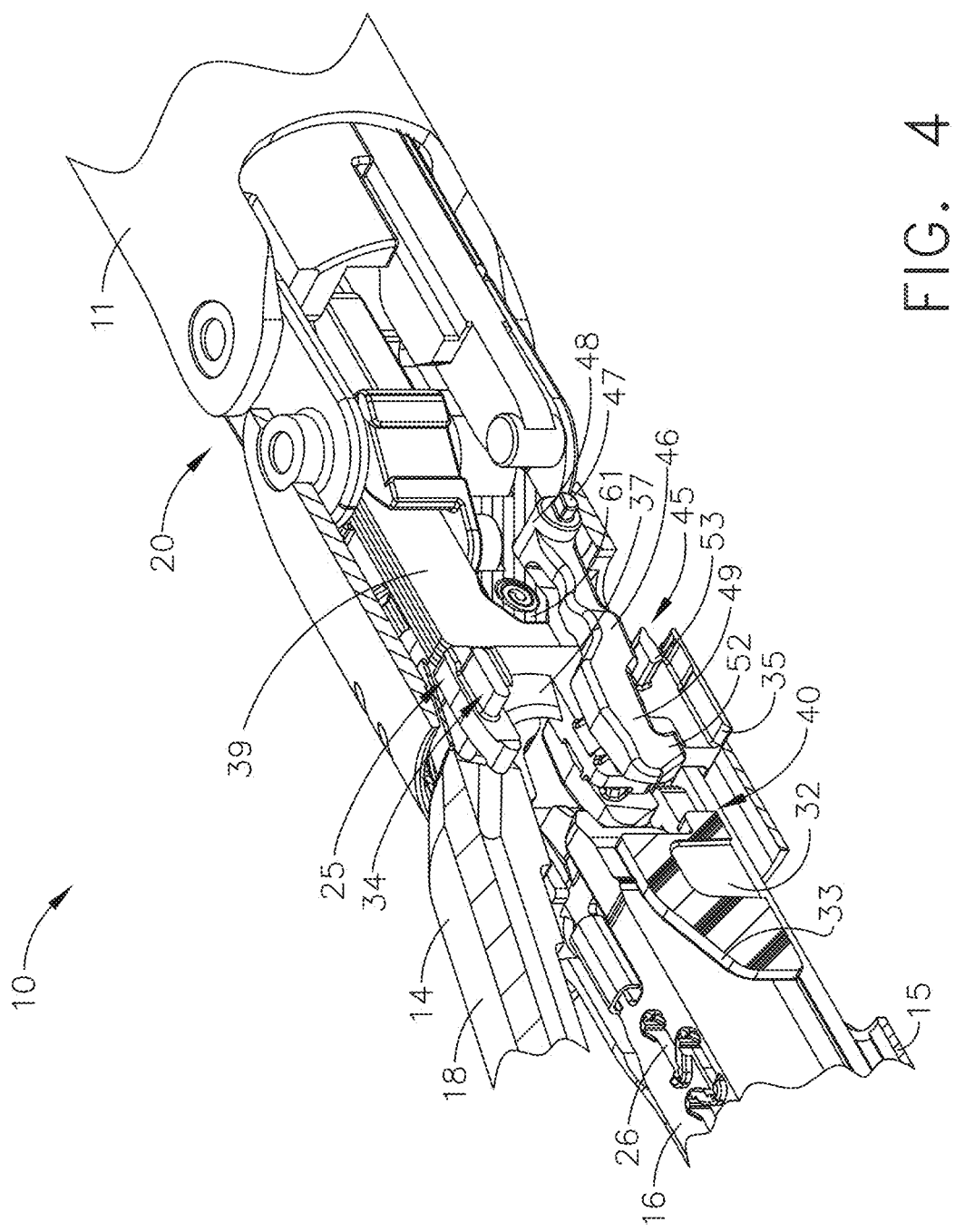
FIG. 4 illustrates a partial perspective view of the surgical instrument of FIG. 1.

Referring primarily to FIGS. 3 and 4, the staple cartridge 16 comprises a cartridge body 21. The cartridge body 21 includes a proximal end 22, a distal end 23, and a deck 24 extending between the proximal end 22 and the distal end 23. In use, the staple cartridge 16 is positioned on a first side of the tissue to be stapled and the anvil 18 is positioned on a second side of the tissue. The anvil 18 is moved toward the staple cartridge 16 to compress and clamp the tissue against the deck 24. Thereafter, staples (not shown) removably stored in the cartridge body 21 can be deployed into the tissue. The cartridge body 21 includes staple cavities 26 defined therein, wherein staples are removably stored in the staple cavities 26. The staple cavities 26 are generally arranged in six longitudinal rows. Three rows of the staple cavities 26 are positioned on a first side of a longitudinal slot 27 and three rows of the staple cavities 26 are positioned on a second side of the longitudinal slot 27. Other arrangements of the staple cavities 26 and staples may be possible.

As described in greater detail below, the surgical instrument 10 staples and cuts tissue by employing a firing mechanism carefully orchestrated to perform the tissue stapling ahead of the tissue cutting. To ensure avoidance of an instance where the tissue cutting occurs ahead of, or without, tissue stapling, the surgical instrument 10 is equipped with various safety features.

The staples of the staple cartridge 16 are generally supported by staple drivers (not shown) in the cartridge body 21. The drivers are movable between a first, or unfired position, and a second, or fired, position to eject the staples from the staple cavities 26. The drivers are retained in the cartridge body 21 by a pan or retainer which extends around the bottom of the cartridge body 21 and includes resilient members configured to grip the cartridge body 21 and hold the retainer to the cartridge body 21. The drivers are movable between their unfired positions and their fired positions by a sled 32 (FIG. 4). The sled 32 is movable between a proximal position adjacent the proximal end 22 and a distal position adjacent the distal end 23. The sled 32 comprises a plurality of ramped surfaces 33 configured to slide under the drivers and lift the drivers, and the staples supported thereon, toward the anvil 18.

Further to the above, the sled 32 is moved distally by a firing member 25. The firing member 25 is configured to contact the sled 32 and push the sled 32 from the proximal position 40 (FIG. 4) adjacent the proximal end 22 toward the distal position adjacent the distal end 23. The longitudinal slot 27 defined in the cartridge body 21 is configured to receive the firing member 25. The anvil 18 also includes a slot configured to receive the firing member 25. The firing member 25 further comprises a first cam 34 which engages the first jaw 14 and a second cam 35 which engages the second jaw 15. As the firing member 25 is advanced distally, the first cam 34 and the second cam 35 can control the distance, or tissue gap, between the deck 24 of the staple cartridge 16 and the anvil 18. The firing member 25 also comprises a knife 37 configured to incise the tissue captured intermediate the staple cartridge 16 and the anvil 18.

The shaft 11 encompasses and guides a firing motion from the housing 19 through a longitudinally-reciprocating laminated firing bar 39 extending proximally from the firing member 25. In particular, the shaft 11 includes a longitudinal firing bar slot that receives the firing bar 39. It should be appreciated that the firing bar 39 may be substituted with a solid firing bar or of other materials in applications not intended to pass through the articulation joint 20, such as depicted in FIG. 4.

Figure 5:
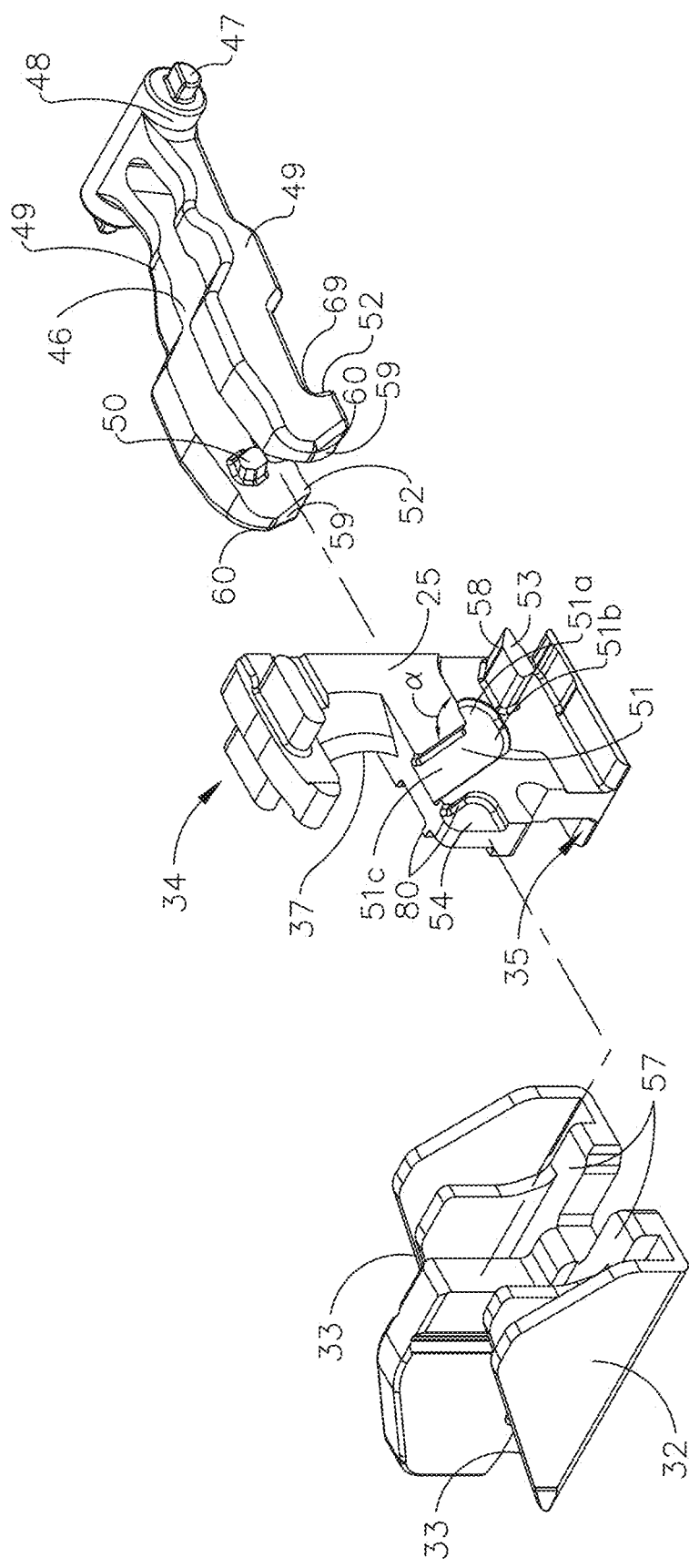
FIG. 5 illustrates perspective views of a sled, a firing member, and a lockout pawl of the surgical instrument of FIG. 1.
Figure 9:
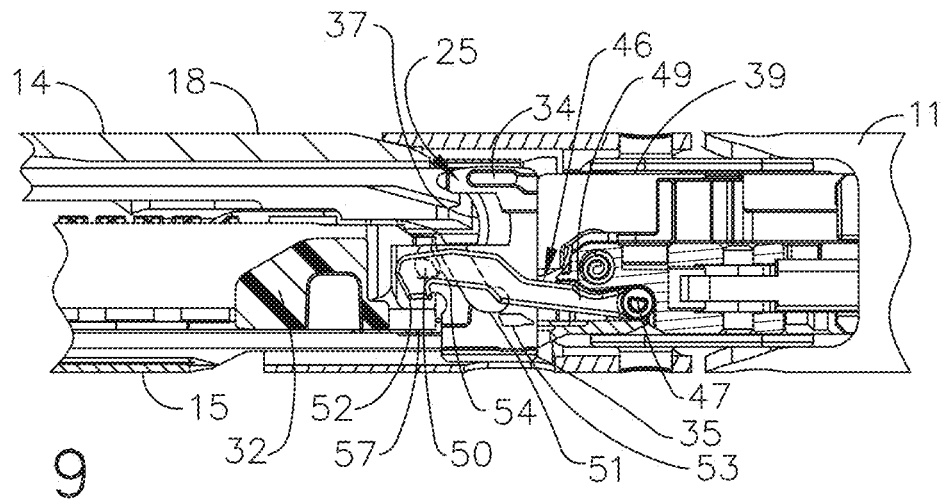
FIGS. 9-11 are partial cross-sectional views of the surgical instrument of FIG. 1 illustrating advancement of a firing member from a home position in the presence of an unfired staple cartridge.
Figure 10:
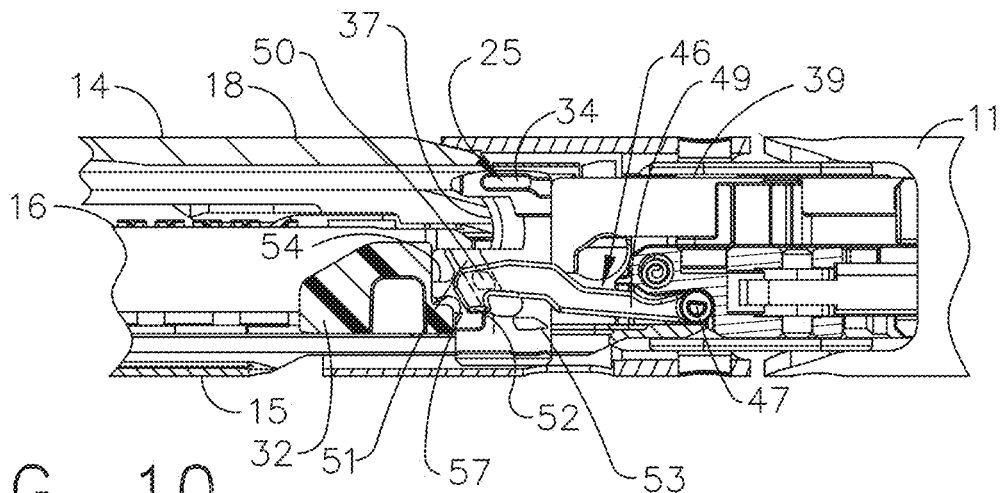
Figure 11:
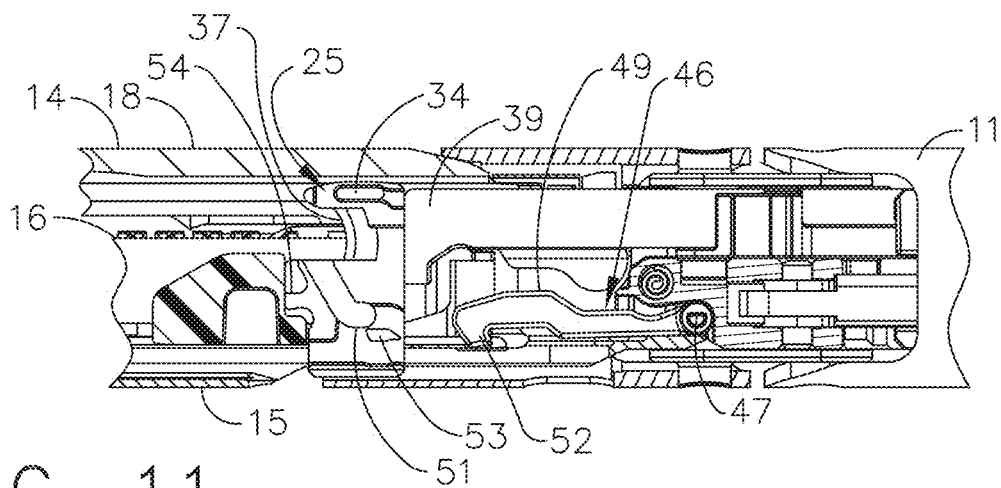

Referring primarily to FIGS. 4 and 5, the surgical instrument 10 includes a firing lockout mechanism 45 that is configured to prevent the firing member 25 from being advanced in the absence of an unfired staple cartridge 16. The firing lockout mechanism 45 can only be bypassed when the sled 32 is positioned in a proximal, initial, or unfired position, as illustrated in FIGS. 9-11. The firing lockout mechanism 45 includes a lockout pawl 46 rotatable about a pivot 47 which can be secured to the shaft 11. In the example illustrated in FIG. 4, the pivot 47 extends transversely with respect to a longitudinal axis defined by the firing bar 39. The pivot 47 is suspended in a position proximal to the firing member 25.

Further to the above, the lockout pawl 46 includes a base 48 and two arms 49 that extend distally from the base 48 straddling the firing member 25. Each of the arms 49 includes a cam feature 50 configured to be received in a corresponding cam slot 51. The cam slots 51 are defined on opposite sides of the firing member 25. In the example of FIG. 4, the base 48 is rotatable relative to the pivot 47. In other examples, however, the base 48 can be integral with, or attached to, the pivot 47 such that the two are rotatable together about an axis transverse to the longitudinal axis defined by the firing bar 39. Each of the arms 49 further includes a locking feature 52 at a distal portion thereof. The locking features 52 are bent away from the first cam 34, and toward the second cam 35. In certain examples, as illustrated in FIG. 4, the locking features form a hook shape which permits the locking features 52 to stop or block advancement of the firing member 25 by catching lockout wings 53 of the firing member 25 in receiving portions 69 of the locking features 52 that are adapted form mating engagement with the lockout wings 53. In various examples, however, the locking features 52 may comprise other shapes and/or may be bent in other directions.

Figure 6:
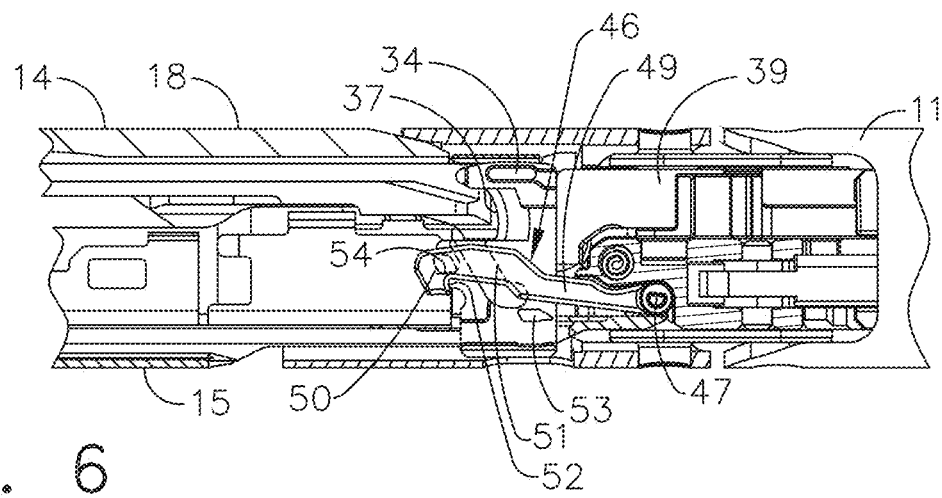
FIGS. 6-8 are partial cross-sectional views of the surgical instrument of FIG. 1 illustrating advancement of a firing member from a home position in the absence of an unfired staple cartridge.
Figure 7:
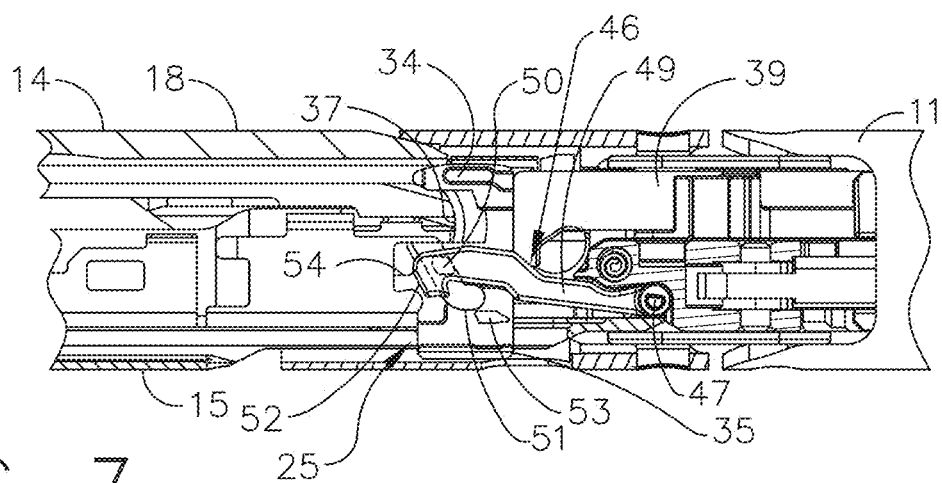
Figure 8:
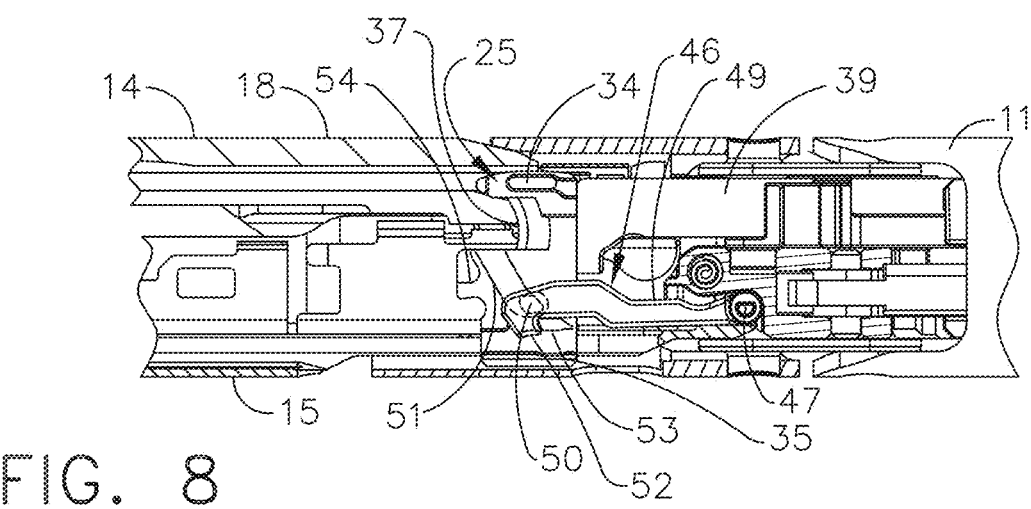

Referring primarily to FIGS. 6-8, the firing lockout mechanism 45 permits a limited motion of the firing member 25 beyond which, and in the absence of an unfired staple cartridge 16, the firing member 25 is stopped or blocked by locking features 52 of the lockout pawl 46. FIG. 6 illustrates the firing member 25 in a resting or initial position, where the locking features 52 are received in corresponding retention pockets 54 on opposite sides of the firing member 25, as illustrated in FIG. 4. While in the retention pockets 54, the locking features 52 maintain the firing member 25 at the resting or initial position by resisting any inadvertent movement of the firing member 25. The inadvertent movement may occur due to any slack in the firing mechanism. The retention pockets 54 ensure that the firing member 25 remains in the resting or initial position until the firing member 25 is advanced by the firing bar 39.

FIG. 7 illustrates the firing member 25 in a slightly advanced position distal to the resting or initial position. The distal advancement of the firing member 25 by the firing bar 39 causes the locking features 52 to become disengaged from the retention pockets 54. In addition, such distal advancement of the firing member 25 causes the cam slots 51 to drive the cam features 50 in a predetermined path, which causes the lockout pawl 46 to rotate in a counter-clockwise direction about the pivot 47. In the absence of an unfired staple cartridge 16, or in the absence of a sled positioned in a proximal, initial, or unfired position, the rotation of the lockout pawl 46 directs the locking features 52 into a locking engagement with the lockout wings 53 of the firing member 25, as illustrated in FIG. 8. In other words, an initial advancement of the firing member 25 in the absence of an unfired staple cartridge 16, or in the absence of a sled positioned in a proximal, initial, or unfired position, automatically activates the firing lockout mechanism 45 to block, stop, or at least resist, further advancement of the firing member 25.

FIGS. 9-11 depict a sequence of positions of the firing member 25 that is similar in many respects to the sequence depicted in FIGS. 6-8. The difference, however, is in the presence of an unfired staple cartridge 16 that is attached to the first jaw 14. FIG. 9 illustrates the firing member 25 in a resting or initial position, where the locking features 52 are received in the corresponding retention pockets 54. In addition, the sled 32 is depicted in a proximal, initial, or unfired position.

FIG. 7 illustrates the firing member 25 in a slightly advanced position distal to the resting or initial position. The distal advancement of the firing member 25 by the firing bar 39 causes the locking features 52 to become disengaged from the retention pockets 54. In addition, such distal advancement of the firing member 25 causes the cam slots 51 to drive the cam features 50 in a predetermined path, which causes the lockout pawl 46 to rotate in a counter-clockwise direction about the pivot 47. The sled 32 includes lockout bypass features 57 which are configured to intercept the locking features 52 to prevent the locking features 52 from engaging the lockout wings 53. In other words, the lockout pawl 46 is configured to rest against the lockout bypass features 57 of the sled 32, which permits further advancement of the firing member 25 with the sled 32 to complete the firing of the staple cartridge 16, as illustrated in FIG. 11.

Figure 12:
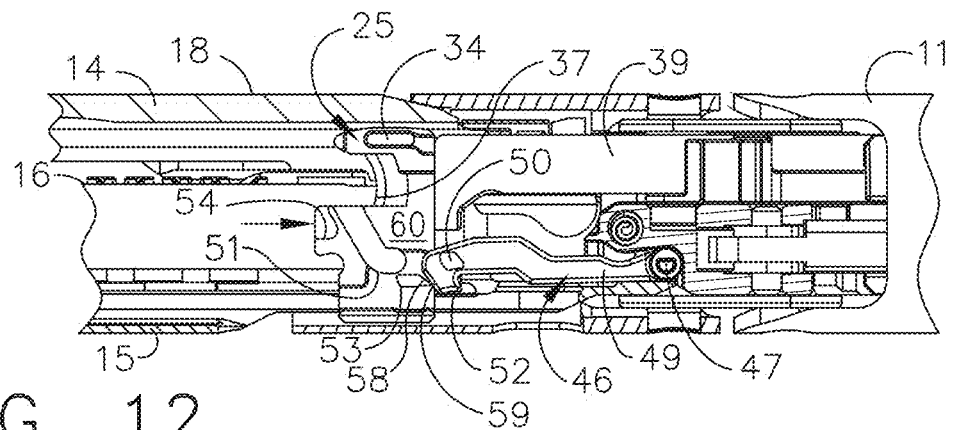
FIGS. 12-14 are partial cross-sectional views of the surgical instrument of FIG. 1 illustrating the return of a firing member to a home position.
Figure 13:
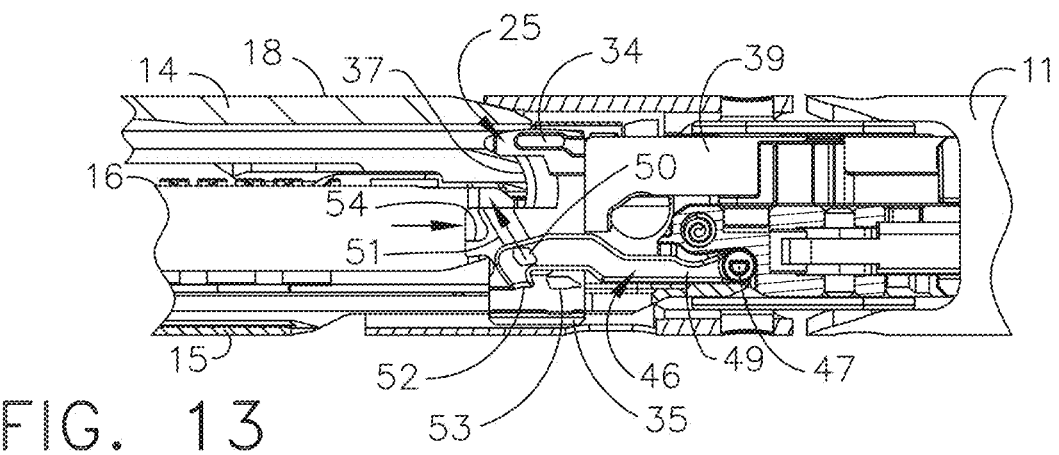
Figure 14:
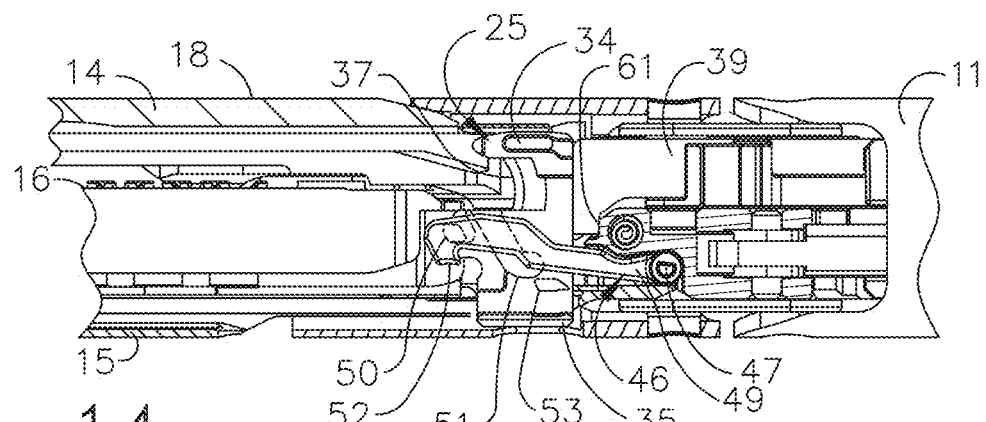

FIGS. 12-14 depict a sequence of positions of the firing member 25 that represents retraction of the firing member 25 by the firing bar 39 to an initial or resting position after completion of the firing of the staple cartridge 16. FIG. 12 illustrates the lockout wings 53 of the firing member 25 re-engaging the lockout pawl 46. The lockout wings 53 comprise proximal ramp portions 58 that are configured to lift the locking features 52 as the firing member 25 is retracted toward the initial or resting position. The proximal ramp portions 58 engage flat, or at least substantially flat, portions 59 of outer ribs 60 of the locking features 52 causing rotation of the lockout pawl 46 in a clockwise direction.

As illustrated in FIG. 13, as the firing member 25 continues to move proximally, the locking features 52 clear the lockout wings 53. In addition, the cam features 50 are re-engaged by the cam slots 51, which drive the cam features 50 to further rotate the lockout pawl 46, in a clockwise direction, about the pivot 47 until the firing member 25 reaches the initial or resting position, as illustrated in FIG. 14. The locking features 52 are also returned to the retention pockets 54. Any additional proximal movement of the firing member 25 causes the firing bar 39 to abut against a hard stop 61 (FIG. 14), which is configured to prevent the firing member 25 from any further proximal movement. In the example illustrated in FIG. 14, the hard stop 61 is a mechanical feature defined in the shaft 11 that is configured to interrupt, stop, and/or block further proximal movement of the firing bar 39, which interrupts, stops, and/or blocks further proximal movement of firing member 25. In certain examples, however, the hard stop 61 can be configured to directly engage the firing member 25.

Referring to FIG. 16, in various examples, the movement of the firing bar 39 and, consequently, the firing member 25 is driven by a motor 71 operably coupled to the firing bar 39. The motor 71 is controlled by a motor driver 72. FIG. 16 illustrates a logic diagram of a circuit 65 configured to detect the return of the firing member 25 to the initial or resting position, and to deactivate the motor 71. The circuit 65 includes a controller 66 comprising a processor 67 and a memory 68.

The motor driver 72, based on input from the controller 66, can be configured to control the rotation of the motor 71 to advance and retract the firing bar 39 and, consequently, the firing member 25. One or more sensors 70 can be configured to detect the presence of the firing member 25 at the initial or resting position. The controller 66 may be configured to receive feedback input from the sensors 70 indicative of the presence of the firing member 25 at the initial or resting position. The controller 66 may also be configured to cause the motor driver 72 to stop the motor 71 in response to receiving an input from the sensors 70 indicating that the firing member 25 has been returned to the initial or resting position. The memory 68 may store a technique, an equation, and/or a look-up table which can be employed by the controller 66 in the assessment.

In at least one example, the return of the firing member 25 to the initial or resting position can be determined based on input from a load cell placed onto the hard stop 61 in the path of the firing member 25. As the firing bar 39 abuts against the load cell and the hard stop 61, the load cell detects an increase in force applied by the firing bar 39 against the hard stop 61. The controller 66 receives input from the load cell, which can be compared to a predetermined threshold. The controller 66 determines that the firing member 25 has reached the initial or resting position when the input from the load cell is equal to or less than the predetermined threshold. In response to such determination, the controller 66 stops the motor 71.

Figure 15:
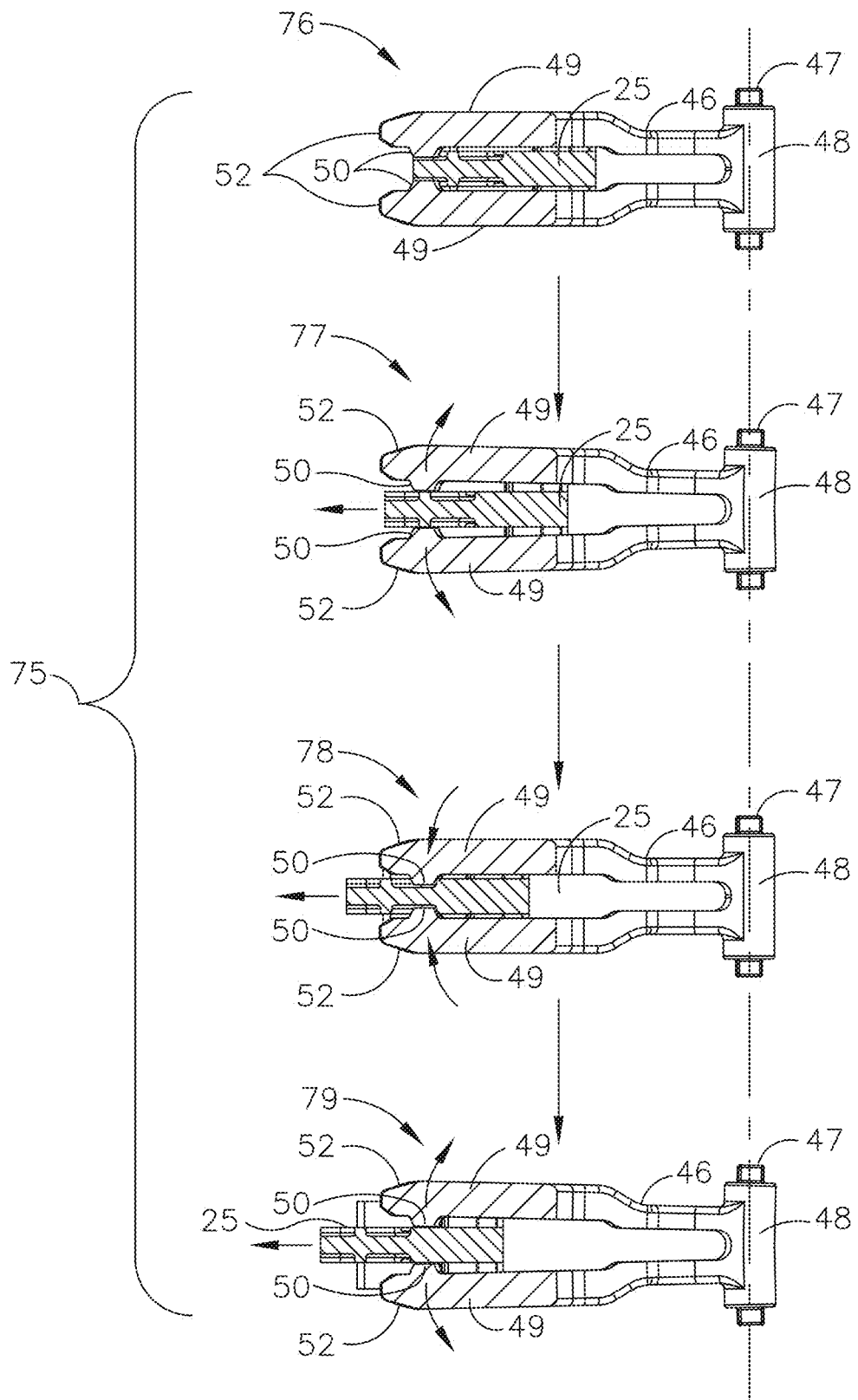
FIG. 15 illustrate four consecutive positions of a firing member of the surgical instrument of FIG. 1 relative to a lockout pawl.

Referring to FIG. 15, a sequence 75 of positions 76-79 illustrate the interaction between the firing member 25 and the lockout pawl 46 during advancement of the firing member 25 by the firing bar 39 to fire the staple cartridge 16. The positions are ordered chronologically from top to bottom. In the first or top position 76, the firing member 25 is in the initial or resting position and, as described above, the locking features 52 of the lockout pawl 46 are received in the retention pockets 54. In the second position 77, the firing member 25 is slightly advance distally, which causes the arms 49 of the lockout pawl 46 to flex outward, away from one another, as the locking features 52 exit the retention pockets 54.

As illustrated in FIG. 5, the cam slots 51 have a shape that is similar to a hockey-stick. The cam slots 51 are defined in the body of the firing member 25 on opposite sides thereof. Each of the cam slots 51 includes a curved portion 51b with a horizontal, or at least substantially horizontal, proximal portion 51a extending from one end of the curved portion 51b, and a slanted distal portion 51c extending from the other end of the curved portion 51b. The proximal portion 51a and the distal portion 51c define an angle ($\alpha$) therebetween that is greater than 90°. In the third position 78, as illustrated in FIG. 15, the cam features 50 snap into the distal portions 51c of cam slots 51 as the arms 49 flex inward toward one another. As the firing member 25 transitions from the second position 77 to the third position 78, the arms 49 of the lockout pawl 46 flex to permit the cam features 50 to cross over ribs 80 that extend between the retention pockets 54 and the distal portions 51c of the cam slots 51.

As described above, the motion of the cam features 50 relative to the cam slots 51 guides and/or drives the counterclockwise rotation of the lockout pawl 46. As the firing member 25 is advanced distally by the firing bar 39, in the absence of an unfired staple cartridge 16, the cam features 50 are guided toward the curved portion 51b and, then, toward the proximal portion 51a. In addition, in the absence of an unfired staple cartridge 16, the cam features 50 are prevented from exiting the proximal portion 51a because the locking features 52 engage the lockout wings 53, which prevents the firing member 25 from further distal movement. Meanwhile, in the presence of an unfired staple cartridge 16, the cam features 50 are guided toward the curved portion 51b but do not reach the proximal portion 51a. Instead, the arms 49 of the lockout pawl 46 flex once more, as indicated the fourth position 79, to permit the cam features 50 to disengage from the cam slots 51 prior to reaching the proximal portion 51a. In the presence of an unfired staple cartridge 16, the lockout bypass features 57 of the sled 32 prevent the locking features 52 of the lockout pawl 46 from engaging the lockout wings 53, which permits further advancement of the firing member 25 to complete the firing sequence.

Although various devices have been described herein in connection with certain embodiments, modifications and variations to those embodiments may be implemented. Particular features, structures, or characteristics may be combined in any suitable manner in one or more embodiments. Thus, the particular features, structures, or characteristics illustrated or described in connection with one embodiment may be combined in whole or in part, with the features, structures or characteristics of one ore more other embodiments without limitation. Also, where materials are disclosed for certain components, other materials may be used. Furthermore, according to various embodiments, a single component may be replaced by multiple components, and multiple components may be replaced by a single component, to perform a given function or functions. The foregoing description and following claims are intended to cover all such modification and variations.

The devices disclosed herein can be designed to be disposed of after a single use, or they can be designed to be used multiple times. In either case, however, a device can be reconditioned for reuse after at least one use. Reconditioning can include any combination of the steps including, but not limited to, the disassembly of the device, followed by cleaning or replacement of particular pieces of the device, and subsequent reassembly of the device. In particular, a reconditioning facility and/or surgical team can disassemble a device and, after cleaning and/or replacing particular parts of the device, the device can be reassembled for subsequent use. Those skilled in the art will appreciate that reconditioning of a device can utilize a variety of techniques for disassembly, cleaning/replacement, and reassembly. Use of such techniques, and the resulting reconditioned device, are all within the scope of the present application.

The devices disclosed herein may be processed before surgery. First, a new or used instrument may be obtained and, when necessary, cleaned. The instrument may then be sterilized. In one sterilization technique, the instrument is placed in a closed and sealed container, such as a plastic or TYVEK bag. The container and instrument may then be placed in a field of radiation that can penetrate the container, such as gamma radiation, x-rays, and/or high-energy electrons. The radiation may kill bacteria on the instrument and in the container. The sterilized instrument may then be stored in the sterile container. The sealed container may keep the instrument sterile until it is opened in a medical facility. A device may also be sterilized using any other technique known in the art, including but not limited to beta radiation, gamma radiation, ethylene oxide, plasma peroxide, and/or steam.

While this invention has been described as having exemplary designs, the present invention may be further modified within the spirit and scope of the disclosure. This application is therefore intended to cover any variations, uses, or adaptations of the invention using its general principles.

Any patent, publication, or other disclosure material, in whole or in part, that is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

EXAMPLES

Example 1—A surgical instrument that comprises an end effector, a firing member movable distally to effect a firing motion in the end effector, and a lockout pawl. The firing member comprises a cam slot. The lockout pawl comprises a cam feature receivable in the cam slot. The cam slot is configured to guide the cam feature to cause a rotation of the lockout pawl between a first position where the lockout pawl permits the distal movement of the firing member, and a second position where the lockout pawl prevents the distal movement of the firing member.

Example 2—The surgical instrument of Example 1, wherein the end effector comprises a sled movable between an unfired position and a fired position.

Example 3—The surgical instrument of Example 2, wherein the sled is configured to prevent the lockout pawl from reaching the second position while the sled is in the unfired position.

Example 4—The surgical instrument of Example 2 or 3, wherein the sled comprises a lockout bypass feature extending proximally from the sled, and wherein the lockout bypass feature is configured to interrupt the rotation of the lockout pawl toward the second position while the sled is in the unfired position.

Example 5—The surgical instrument of Example 4, wherein the rotation of lockout pawl toward the second position is not interrupted by the lockout bypass feature while the sled is in the fired position.

Example 6—The surgical instrument of Example 1, 2, 3, 4, or 5, wherein the firing member comprises a lockout member protruding laterally from the firing member, and wherein the lockout pawl comprises a locking feature configured to lockingly engage the lockout member when the lockout pawl is in the second position.

Example 7—The surgical instrument of Example 6, wherein the lockout member comprises a wing shape.

Example 8—The surgical instrument of Example 6 or 7, wherein the lockout member comprises a proximal portion and a distal portion greater in size than the proximal portion.

Example 9—The surgical instrument of Example 8, wherein the locking feature comprises a receiving portion adapted for mating engagement with the distal portion of the lockout member.

Example 10—The surgical instrument of Example 1, 2, 3, 4, 5, 6, 7, 8, or 9, wherein the cam slot comprises a first slot portion and a second slot portion defining an obtuse angle with the first slot portion.

Example 11—The surgical instrument of Example 1, 2, 3, 4, 5, 6, 7, 8, 9, or 10, wherein the firing member comprises a cutting member.

Example 12—The surgical instrument of Example 1, 2, 3, 4, 5, 6, 7, 8, 9, 10, or 11, wherein the lockout pawl comprises a distal locking feature, and wherein the firing member comprises a retaining pocket configured to secure the distal locking feature while the lockout pawl is in the first position.

Example 13—A surgical instrument that comprises a shaft, an end effector extending distally from the shaft, a hard stop, a firing assembly, and a lockout pawl. The end effector comprises a staple cartridge including a plurality of staples. The firing assembly is movable distally from a home position to deploy the staples from the staple cartridge. The firing assembly is configured to abut against the hard stop at the home position. The firing assembly comprises a firing member including a cam slot. The lockout pawl comprises a cam feature receivable in the cam slot. The cam feature is configured to disengage from the cam slot during the distal movement of the firing assembly. The cam feature is configured to reengage the cam slot during return of the firing assembly to the home position.

Example 14—The surgical instrument of Example 13, wherein the cam slot is configured to guide the cam feature to cause a rotation of the lockout pawl between a first position where the lockout pawl permits the distal movement of the firing member, and a second position where the lockout pawl prevents the distal movement of the firing member.

Example 15—The surgical instrument of Example 14, wherein the end effector comprises a sled movable by the firing assembly between an unfired position and a fired position, and wherein the sled is configured to prevent the lockout pawl from reaching the second position while the sled is in the unfired position.

Example 16—The surgical instrument of Example 15, wherein the sled comprises a lockout bypass feature extending proximally from the sled, and wherein the lockout bypass feature is configured to interrupt the rotation of the lockout pawl toward the second position while the sled is in the unfired position.

Example 17—The surgical instrument of Example 13, 14, 15, or 16, further comprising a sensor configured to detect the abutment of the firing assembly against the hard stop at the home position.

Example 18—A surgical instrument that comprises a shaft, an end effector extending distally from the shaft, a firing assembly, and a lockout pawl. The end effector comprises a staple cartridge including a plurality of staples. The firing assembly is movable distally from a home position to deploy the staples from the staple cartridge. The firing assembly comprises a firing member. The firing member comprises a cam slot and a retention pocket. The lockout pawl comprises a locking feature receivable in the retention pocket and a cam feature receivable in the cam slot. The cam feature is configured to disengage from the cam slot during the distal movement of the firing assembly. The cam feature is configured to reengage the cam slot during return of the firing assembly to the home position. The cam slot is configured to guide the locking feature into the retention pocket during the return of the firing assembly to the home position.

Example 19—The surgical instrument of Example 18, wherein the firing member comprises a lockout wing, wherein the lockout pawl comprises a locking feature, and wherein the lockout wing is configured to lift the locking feature during the return of the firing assembly to the home position to cause the cam feature to reengage the cam slot.

What is claimed is:

1. A surgical instrument, comprising:
   an end effector;
   a motor;
   a firing beam drivable by the motor to implement a firing motion and a retraction motion, wherein the firing beam moves within the end effector away from a first position towards a second position during the firing motion and moves away from the second position towards the first position during the retraction motion;
   a sensor to detect the firing beam in the first position; and
   a control circuit operatively coupled to the motor and the sensor, wherein the control circuit is to:
      activate the motor to implement the firing motion;
      activate the motor to implement the retraction motion; and
      deactivate the motor based on the sensor detecting the firing beam in the first position during the retraction motion, wherein the end effector comprises a hard stop to block the firing beam from moving past the first position during the retraction motion, and wherein the sensor is to detect a force of the firing beam against the hard stop.

2. The surgical instrument of claim 1, wherein the sensor comprises a load cell.

3. The surgical instrument of claim 2, wherein the control circuit is to deactivate the motor based on comparing the force detected by the sensor to a predetermined threshold.

4. The surgical instrument of claim 1, wherein the first position is a proximal position in the end effector, and wherein the second position is a distal position in the end effector.

5. The surgical instrument of claim 1, further comprising a motor driver operatively coupled to the motor and the control circuit.

6. The surgical instrument of claim 1, wherein the end effector is to receive a staple cartridge, and wherein the firing motion is to eject staples from the staple cartridge.

7. The surgical instrument of claim 1, further comprising a lockout pawl to lock the firing beam in the first position after the retraction motion to prevent a second firing motion.

8. The surgical instrument of claim 7, wherein the firing beam comprises a cam slot, a protrusion, and a retaining pocket, wherein the lockout pawl comprises a cam receivable in the cam slot during the retraction motion, wherein the cam slot is to guide the cam and move the lockout pawl toward locking the firing beam in the first position, and wherein the retaining pocket is configured to receive the cam such that the lockout pawl locks the firing beam in the first position.

9. The surgical instrument of claim 8, wherein the end effector is configured to receive a staple cartridge comprising a sled, wherein the firing beam is to push the sled from an unfired position to a fired position during the firing motion, and wherein the sled in the unfired position prevents the lockout pawl from locking the firing beam in the first position.

10. A control circuit comprising a processor configured to:
activate a motor of a surgical instrument to implement a firing motion that causes a firing beam to move within an end effector of the surgical instrument away from a first position towards a second position;
activate the motor of the surgical instrument to implement a retraction motion that causes the firing beam to move within the end effector of the surgical instrument away from the second position towards the first position;
receive a signal from a sensor of the surgical instrument indicating that the firing beam is in the first position during the retraction motion; and
deactivate the motor based on receiving the signal, wherein the signal received from the sensor indicates a force of the firing beam against a hard stop blocking the firing beam from moving past the first position during the retraction motion.

11. The control circuit of claim 10, wherein the signal received from the sensor is a load cell signal.

12. The control circuit of claim 10, wherein the processor is configured to deactivate the motor based on comparing the force indicated by the signal to a predetermined threshold.

13. The control circuit of claim 11, further comprising a motor driver to activate and deactivate the motor.

* * * * *